United States Patent
Raddon

[11] Patent Number: 5,830,245
[45] Date of Patent: Nov. 3, 1998

[54] PORTABLE FUEL ELEMENT

[76] Inventor: Stanley J. Raddon, 301 Cambridge Dr., Arcadia, Calif. 91006

[21] Appl. No.: 761,528

[22] Filed: Dec. 6, 1996

Related U.S. Application Data

[63] Continuation-in-part of Ser. No. 406,535, Mar. 20, 1995, abandoned.

[51] Int. Cl.$^6$ .................................................. C10L 5/00
[52] U.S. Cl. .............................. 44/544; 44/519; 44/532; 44/533; 44/541; 44/542; 44/590; 44/506; 44/507; 126/30; 126/25 R; 126/50
[58] Field of Search .............................. 44/519, 532, 533, 44/541, 542, 543, 544, 572, 590, 593, 506, 507; 126/30, 25 R, 50

[56] References Cited

U.S. PATENT DOCUMENTS

| | | | |
|---|---|---|---|
| 192,011 | 6/1877 | Richardson | 126/30 |
| 198,133 | 12/1877 | Matchett | 44/542 |
| 422,899 | 3/1890 | Adams et al. | 126/30 |
| 617,424 | 1/1899 | Pflaum | 44/533 |
| 2,811,428 | 10/1957 | Smith | 44/519 |
| 3,367,757 | 2/1968 | Church | 44/533 |
| 3,744,980 | 7/1973 | Harris | 44/590 |
| 4,120,666 | 10/1978 | Lange | 44/590 |
| 4,485,584 | 12/1984 | Raulerson et al. | 44/532 |

*Primary Examiner*—Prince Willis, Jr.
*Assistant Examiner*—Cephia D. Toomer
*Attorney, Agent, or Firm*—John R. Ross; John R. Ross, III

[57] ABSTRACT

A portable fuel element made from stacked sheets of cardboard impregnated and held together with paraffin wax. In a preferred embodiment, each portable fuel element contains at least one match that is protected from moisture by the paraffin wax and cardboard. The embodiment is made from a stack of five sheets of paraffin wax impregnated recycled cardboard. The stack, which is about ¾ inch high, is perforated into 2½ inch squares. Rectangular blocks that measure ¾ inch high, 2½ inches wide, and 5 inches long are broken out along the perforations, leaving a perforation in the middle of each block which separates each rectangular block into two 2½ inch square, ¾ inch thick blocks attached at the perforation. A wick is placed into each half of each block and two matches are inserted inside the rectangular block along the line formed by the perforation. The rectangular block is then dipped into paraffin wax to get a wax coating. When needed to start a fire the rectangular block is easily broken into two halves which exposes the two protected matches. The matches are used to light the wicks. The fuel elements are excellent for starting wood or charcoal fires and for backpacking. A cook kit for cooking with the fuel elements is described.

15 Claims, 8 Drawing Sheets

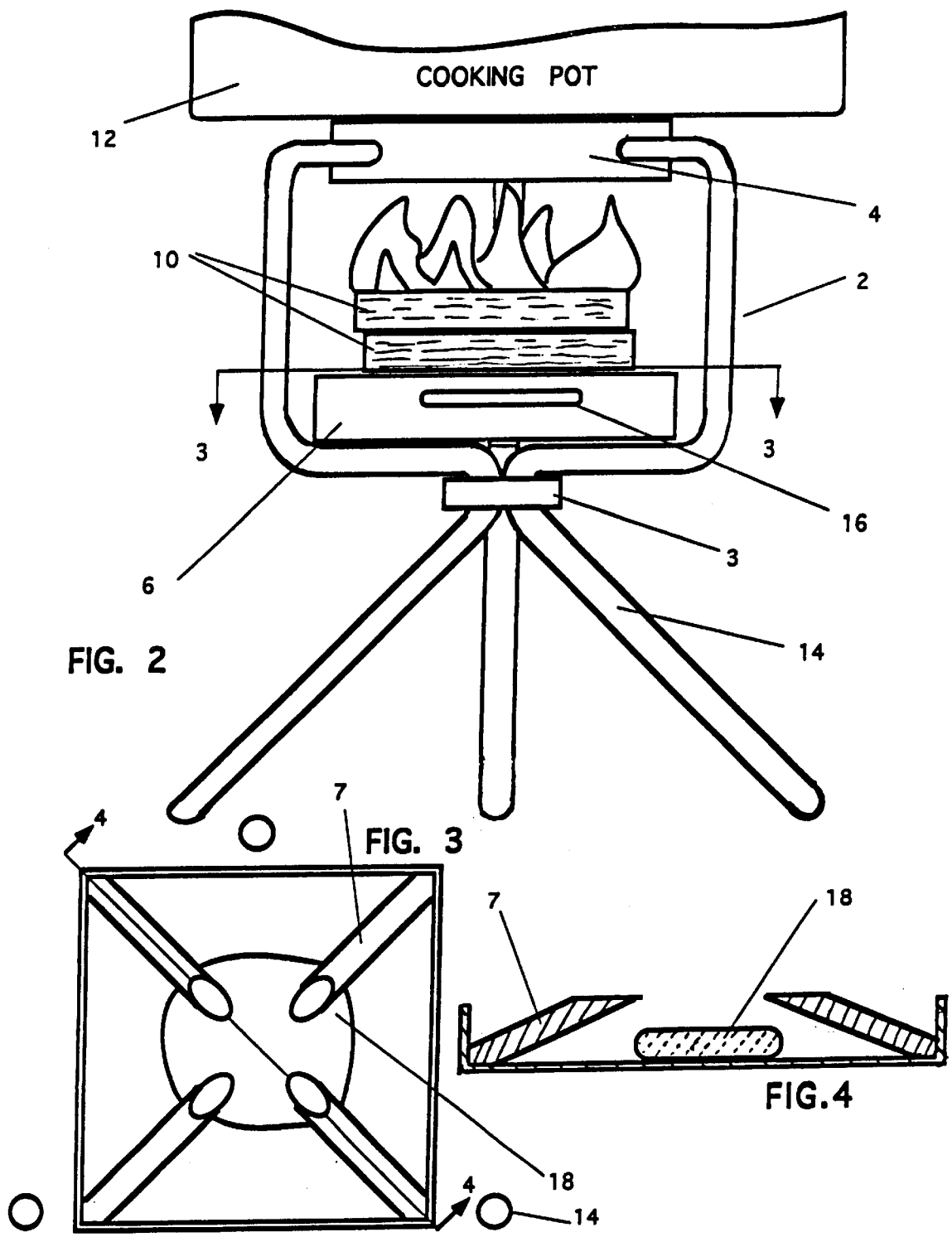

5,830,245

PORTABLE FUEL ELEMENT

This is a Continuation-In-Part Application of patent application Ser. No. 08/406,535, filed Mar. 20, 1995 abandoned. This invention relates to fuels and in particular portable fuels.

BACKGROUND OF THE INVENTION

There is a large variety of light weight portable fuels currently on the market for starting wood or charcoal fires or for use by backpackers for cooking. These include a very popular propane/butane combined pressurized canned fuel distributed by Application Des Gaz, Paris,France. Pressurized propane gas is distributed by Coleman, Wichita Kans. A refined petroleum naptha product is distributed to backpacking stores by Mountain Safety Research, Seattle Wash. Colgate Palmolive distributes Sterno and a liquefied petroleum gas is distributed by Suunto USA of Carlsbad, Calif. Coghlan's Ltd. of Winnipeg, Canada distributes a product called Fire Sticks which appears to be pressed sawdust with some kind of petroleum binder.

When fuel in metal containers are carried on backpacking wilderness trips, the metal is a significant extra load. And it must be born throughout the trip since it is usually necessary to pack the empty containers out of wilderness areas. When matches are carried into the wilderness, they often get wet while exposed to the weather which ruins them for possible use in starting a fire.

Paraffin wax is a solid crystalline hydrocarbon mixture derived from the paraffin distillate portion of crude petroleum. Paraffin wax is widely used for paper coating to form wax paper. It is also used to make candles. Paraffin wax is also used for sealing foods.

A very large portion of products sold in the United States and much of the rest of the world is distributed in cardboard boxes. (The cardboard from which these boxes are typically made comprises a top sheet of paper, a bottom sheet of paper and a corrugated sheet of paper sandwiched between the top and bottom sheets to form a series of parallel portals through the cardboard. When I refer to cardboard in this patent application, I will be referring to this type of cardboard.) The boxes are normally not reused and therefore constitute a serious waste product. Some efforts have been made to recycle cardboard boxes but without much success. Most used cardboard ends up in landfills.

What is needed is a better light weight portable fuel for starting wood and charcoal fires and for backpacking. Also needed is a good use for used cardboard.

SUMMARY OF THE INVENTION

The present invention provides a portable fuel element made from stacked sheets of cardboard impregnated and held together with paraffin wax. In a preferred embodiment, each portable fuel element contains at least one match that is protected from moisture by the paraffin wax and cardboard. The embodiment is made from a stack of five sheets of paraffin wax impregnated recycled cardboard. The stack, which is about ¾ inch high, is perforated into 2½ inch squares. Rectangular blocks that measure ¾ inch high, 2½ inches wide, and 5 inches long are broken out along the perforations, leaving a perforation in the middle of each block which separates each rectangular block into two 2½ inch square, ¾ inch thick blocks attached at the perforation. A wick is placed into each half of each block and two matches are inserted inside the rectangular block along the line formed by the perforation. The rectangular block is then dipped into paraffin wax to get a wax coating. When needed to start a fire the rectangular block is easily broken into two halves which exposes the two protected matches. The matches are used to light the wicks. The fuel elements are excellent for starting wood or charcoal fires and for backpacking. A cook kit for cooking with the fuel elements is described.

BRIEF DESCRIPTION OF PREFERRED EMBODIMENTS

FIGS. 2, 3 and 4 are drawings of a cook kit for cooking with the present invention.

DETAILED DESCRIPTION OF PREFERRED EMBODIMENTS

Figure 1:
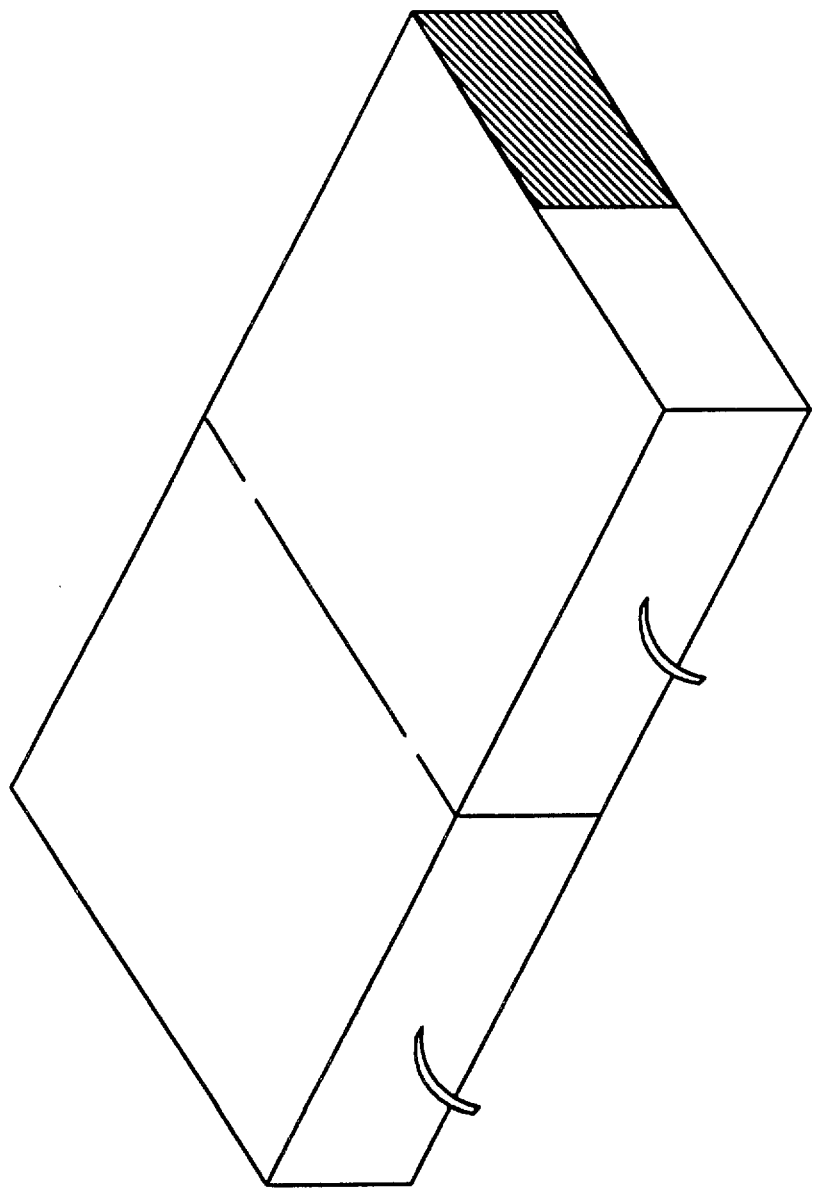
FIG. 1 is drawing of a preferred embodiment of the present invention.

A preferred embodiment of the present invention can be described by reference to the drawings. FIG. 1 is a drawing of a portable fuel element according to the present invention. Its dimensions are 2½ inches by 2½ inches and about ¾ inch high.

A preferred method of fabrication is as follows. Cut recycle cardboard into squares 25 inches by 25 inches. In this preferred embodiment, we used cardboard having a thickness slightly larger than ⅛ inch and having about seven corrugations per inch.

(By seven corrugations per inch I mean there are seven portals per inch running through each of the 5 cardboard squares.) In my preferred embodiment I used cardboard made of 100 weight paper, but a wide variety of weights of paper would work very well. The 25-inch cardboard sheets are first soaked in a bath of melted paraffin wax maintained at a temperature of 200° F. for a period of about 1 minute.

My preferred paraffin wax is Aristowax 140. It has a melting point of 140° F. and a congealing point of about 137° F. Its needle pen at 77° F. is 12 and at 100° F. is 22. Its specific gravity at 212° F. is 0.76 and at 60° F. its specific gravity is 0.921. Its flash point is 490° F. Paraffin wax is available from many sources such as Chevron and Unical.

Figure 5A:
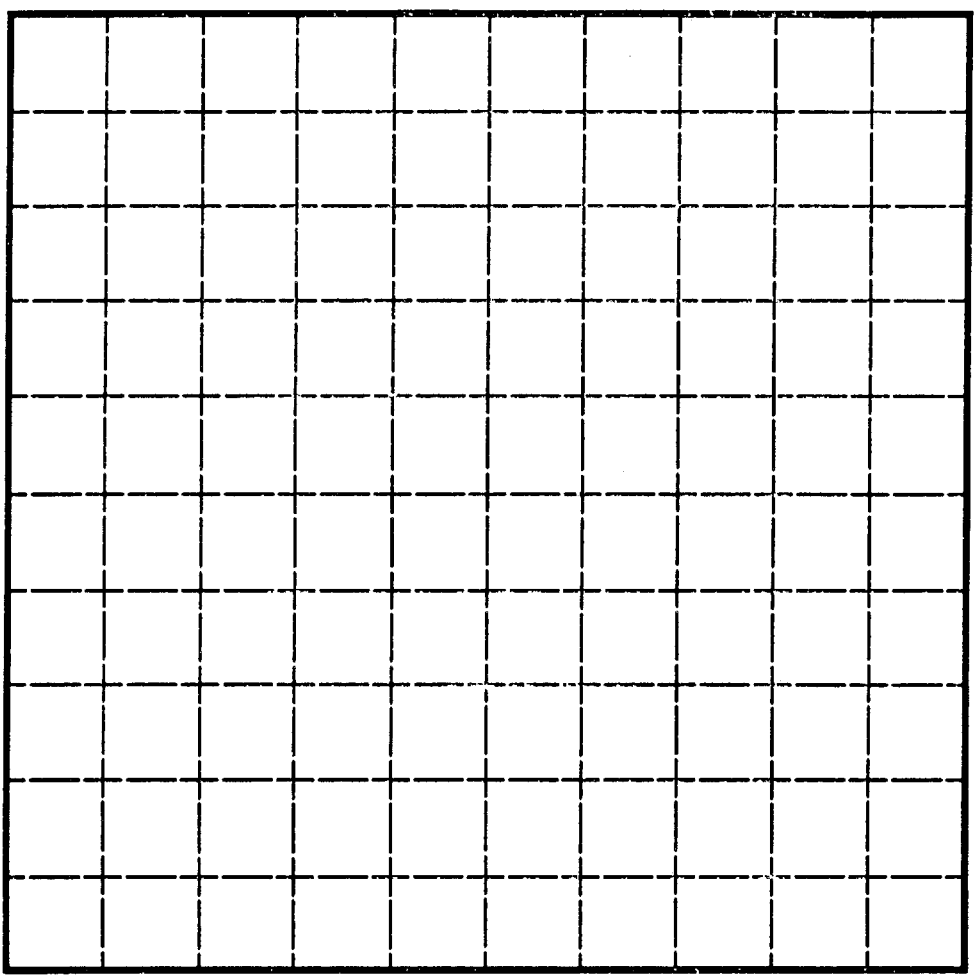
FIG. 5A is a drawing of a sheet of cardboard cut into perforations.
Figure 5B:
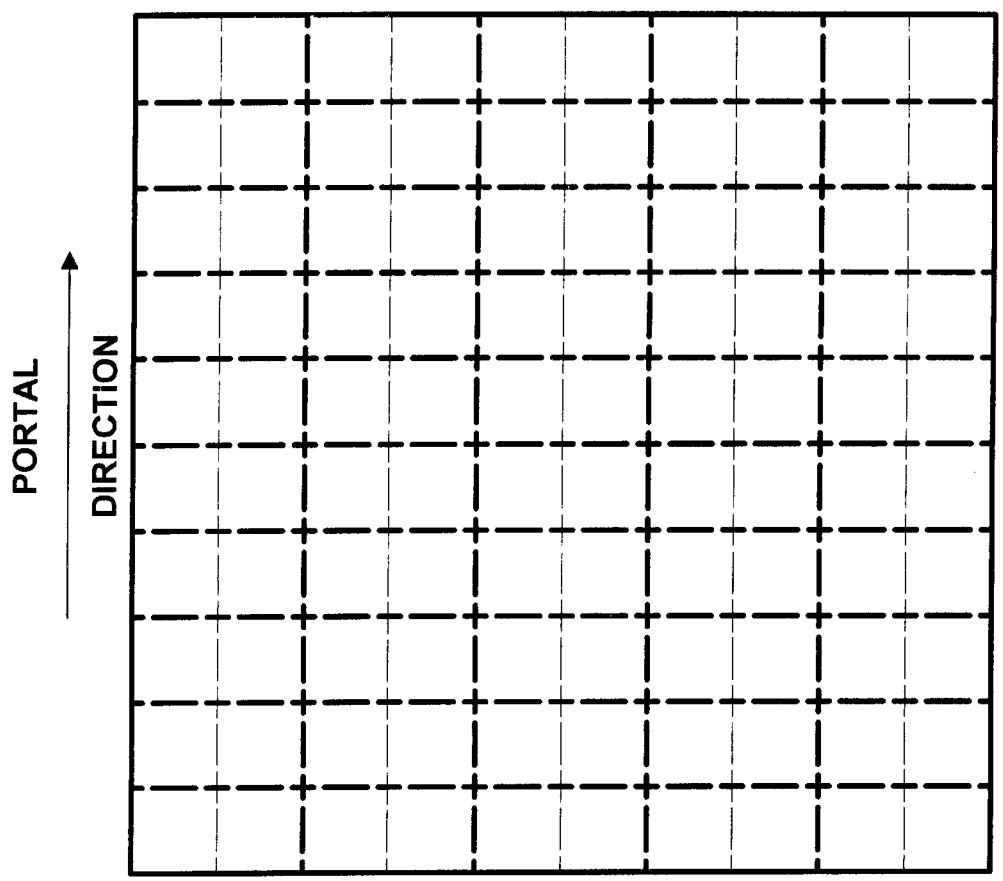
FIG. 5B shows how a stack of sheets are separated into fifty rectangular fuel elements.
Figure 6:
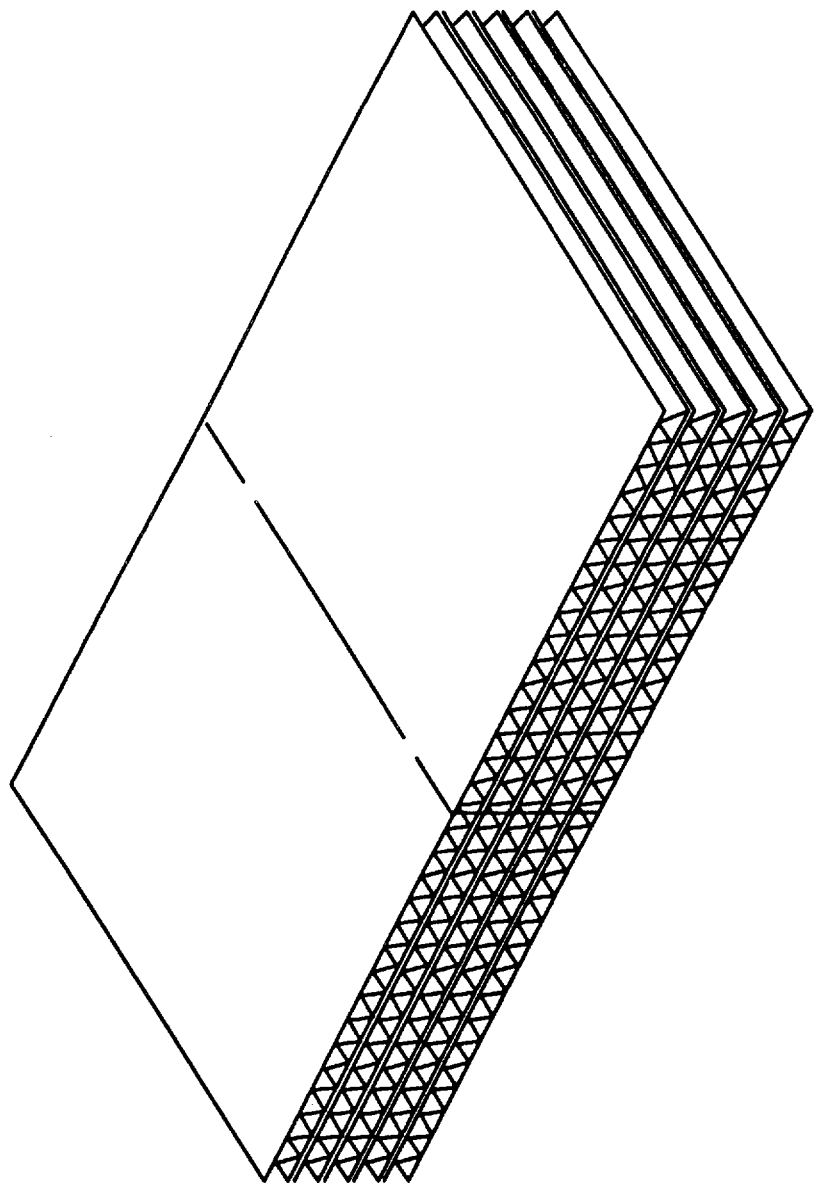
FIG. 6 is a drawing of a rectangular block after being broken out from the stack of paraffin wax impregnated cardboard.
Figure 7:
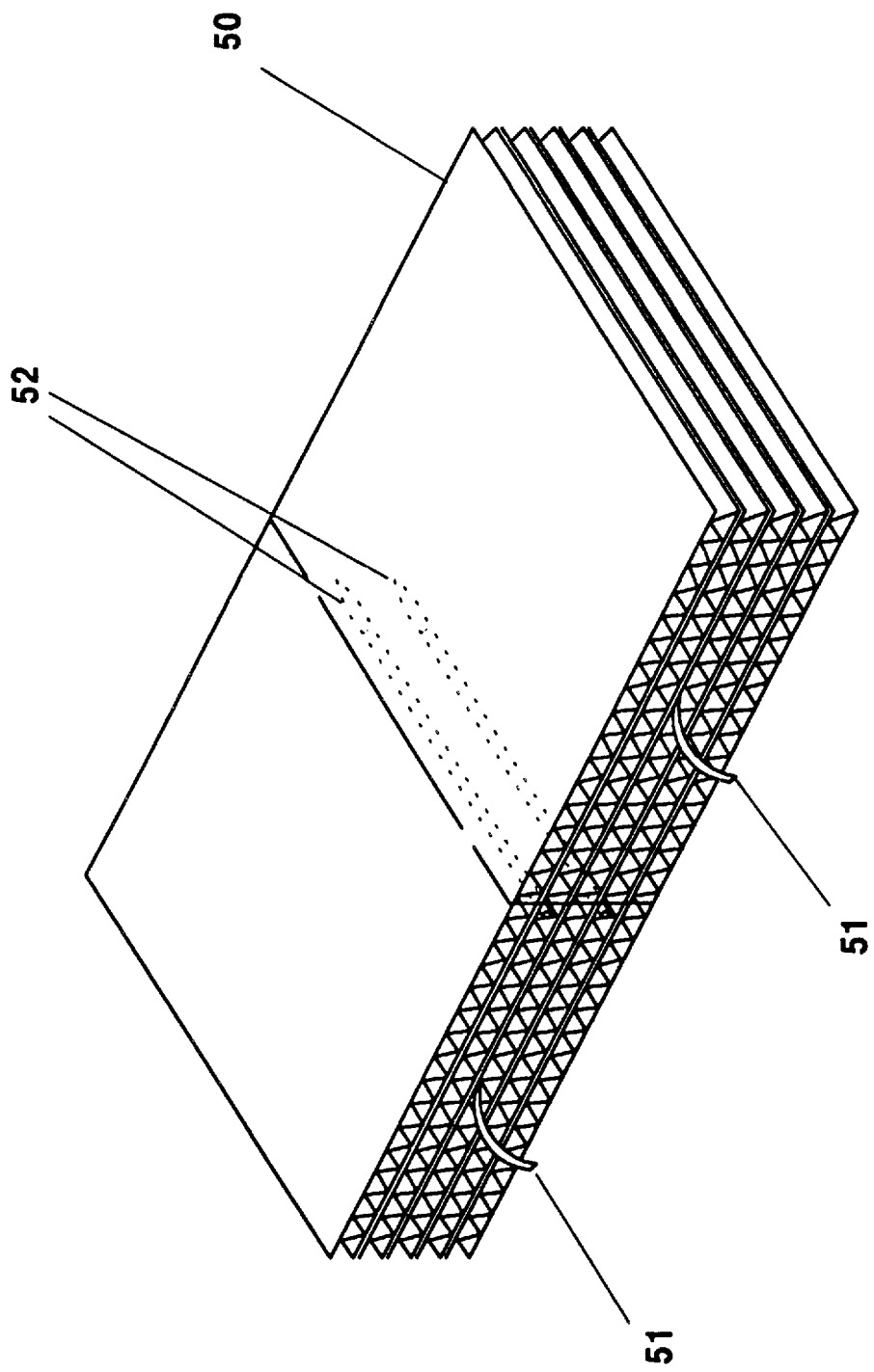
FIG. 7 is a drawing of a of the rectangular block after matches and wicks have been inserted.
Figure 8:
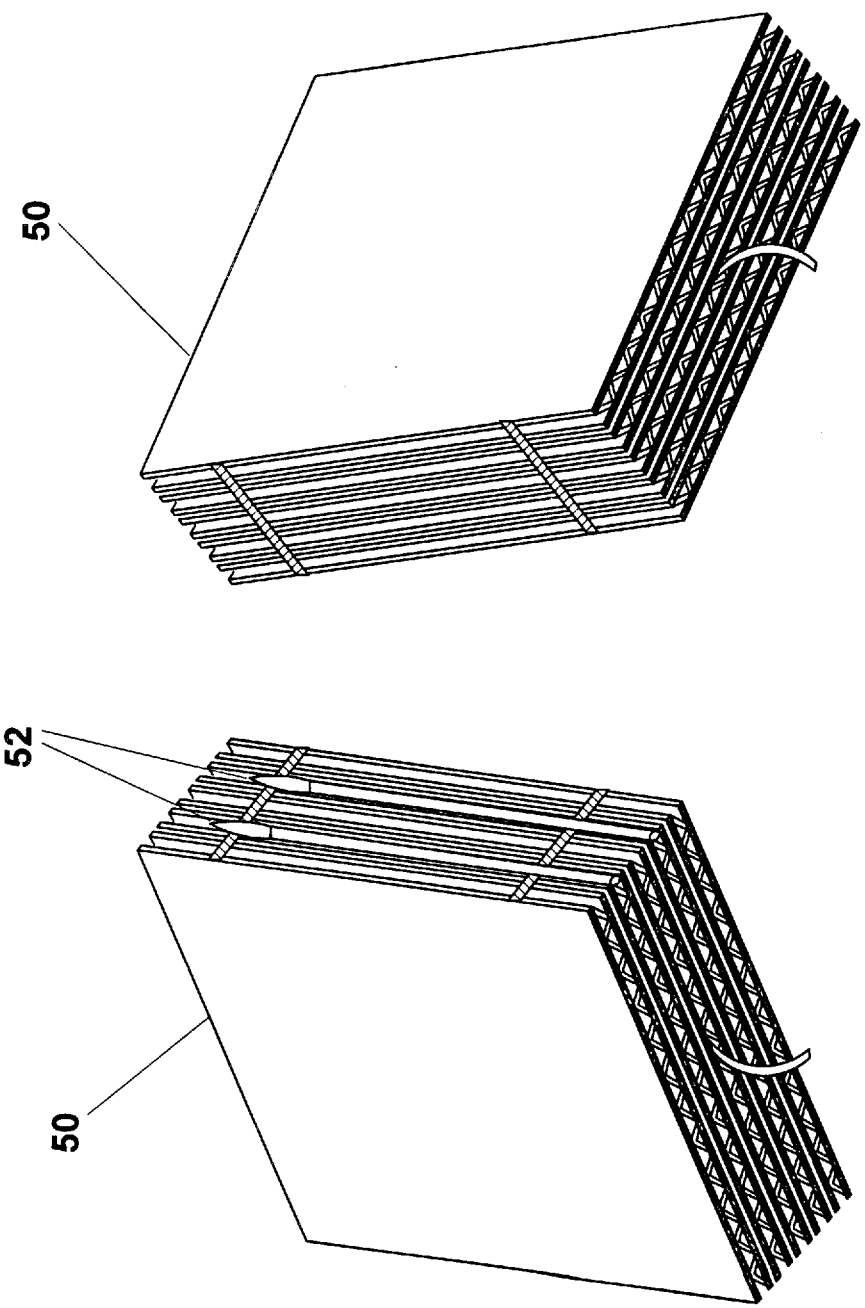
FIG. 8 shows the rectangular block broken into two square blocks exposing the two matches.
Figure 9:
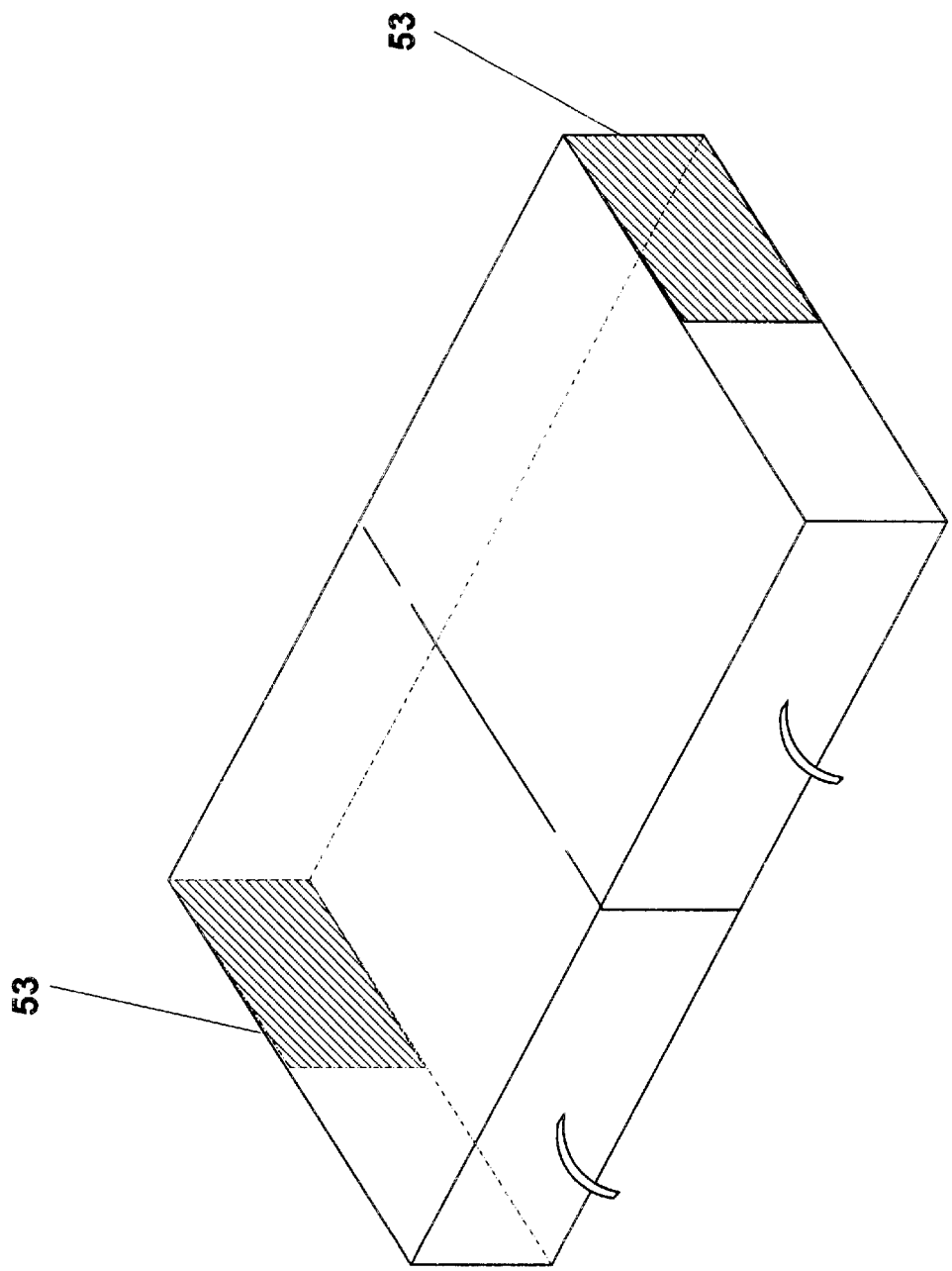
FIG. 9 shows the rough striking paper glued to the rectangular block.

The sheets are then removed from the wax and perforations are cut vertically and horizontally 2½ inches apart, as shown in FIG. 5A. The perforations are cut such that there is a ⅛ inch (long) connecting piece of cardboard spaced approximately every 1¼ inch of cut as shown in several of the figures. The small amount of cardboard connecting the cardboard squares allows for easy separation of the squares along the perforations. The sheets are then stacked five high such that the orientation of the portals of adjacent layers all facing the same direction and the perforations are lined up with each other, as shown in FIG. 5B. The stack of cardboard is pressed to a thickness of about ¾ inch and allowed to cool until the paraffin is solid. Blocks with Dimensions measuring ¾ inch high, 2½ inches wide and 5 inches long are broken out from the stack of sheets leaving a perforation down the middle of each block, as shown in FIG. 6. Wicks 51 (each comprised of ⅛-inch diameter, 2-inch long cotton wick made of 42 ply wick material, supplied by Atkins & Pearce with offices in Covington, Ky.) are inserted into two open parallel portals of each block 50, as shown in FIG. 7. Two wood matches 52 (each 2³⁄₁₀ inches long and ⅛ inch in diameter, supplied by Diamonds Brand Inc., with offices in Minneapolis, Minn.) are inserted in two of the parallel portals along the perforation of block 50 as shown in FIG. 7. This product is then immersed in a bath of melted paraffin maintained at a temperature of about 175° F. for a period of a couple of seconds, after which the rectangular blocks are removed and allowed to cool. After the rectangular blocks have cooled, rough striking paper is glued to each end of the rectangular block, as shown in FIG. 9. The striking paper is preferably the same type of paper commonly used on the side of commercially available match boxes. Or a very fine grain sand paper can be used. The rectangular block is then packaged. Each completed rectangular block weighs about 2.8 ounces. I plan to market these cardboard paraffin fuel blocks as "Mighty Light" camp fuel. The user when he is ready to use the Mighty Light fuel, breaks the rectangular block as shown in FIG. 8. This exposes the two matches 52. The user then lights one or both of the square block by striking a match on striking paper 53 and lighting fuse 51.

The result is an excellent wood or charcoal fire starter and an excellent lightweight backpacking fuel. The matches are easily ignited by striking them in the usual manner even after the fuel has been immersed in water for hours. One block will burn with a hot flame for 12 to 20 minutes. The flame is about 8 inches. Two of the blocks placed one on top of the other will bring two cups of water to a boil and maintain it boiling for 5 minutes. This is sufficient time to cook a typical backpacking meal. The block produces very little waste. The ash remaining is completely insignificant (less than 2 percent by weight) and can be blown away with a breath of air or easily "packed out" by the purist.

I have designed a cook kit for use with the fuel blocks. A drawing of the cook kit is shown in FIG. 2. It's wire frame 2 is fabricated from three pieces of ¼ inch diameter steel wire bent into the shapes shown in FIG. 2. The three pieces of the wire frame pass through collar 3 and connect at the top to a 4-inch diameter circular pot seat 4 made of ½ inch wide 16 gage sheet steel as shown in the drawing. A small 3½ inches by 3½ inches square fuel cup 6 is ½ inch high is fabricated of 16 gage sheet steel and is positioned as shown in FIG. 2. Fuel cup 6 comprises four wire supports 7 in the bottom of the cup extending upward as shown in FIG. 4. A lava rock 18 is preferably placed in the bottom of the cup. The rock absorbs heat from the flame, gets very hot and assures that any paraffin which drips out of the fuel blocks is quickly ignited. The fuel blocks 10 (usually two of them) are placed on the cup and lighted. A cooking pot 12 rests on the pot seat 4. The legs 14 are about 8 inches apart at the points where they rest on the ground. The fuel cup is about 5¼ inches above the ground. Slot like holes 16 are provided in the sides of the fuel cup to permit air circulation.

The foregoing description of the present invention has been presented for the purpose of illustration and is not intended to limit the invention to the precise form disclosed. It is understood that many modifications and changes may be effected by those skilled in the art. For example, as indicated above many types of cardboard can be used, but as indicated by my definition of cardboard, it should be the type with a corrugated sheet of paper sandwiched between two other sheets of paper. This is important to permit better absorption of paraffin and to permit air to circulate through the block during the burning process. Many paraffin waxes could be substituted for the specified waxes so long as the wax is a solid at temperatures below about 90° F. Shorter or longer soaking times could be used and the temperatures could be varied somewhat to adjust the amount of paraffin in the blocks. A preferred method of marketing the fuel blocks for camping would be to package them inside a metal can having appropriate ventilation. The can can then be used as a camping stove in which the fuel is burned. The blocks could be fabricated in various sizes other that the size suggested; however, I would not recommend blocks wider than about 5 inches. Cubes of paraffin could be provided with the above described fuel element. These cubes could be added to the fire in the burn cup once the fire is burning well. Accordingly it is intended by the appended claims to cover all such modifications and changes as fall within the true spirit and scope of the invention.

I claim:

1. A portable fuel element comprised of a plurality of stacked sheets of cardboard impregnated and held together with paraffin wax, comprising:
   a) at least two fuel element subsections separated by a perforation, and
   b) at least one match located in a portal of one of said stacked sheets said portal being parallel and adjacent to said perforation.

2. A portable fuel element as in claim 1 wherein said plurality of stacked sheets of cardboard are at least five stacked sheets of cardboard.

3. A portable fuel element as in claim 2 wherein each of said sheets define a plurality of parallel portals defining a portal direction and the portal direction of each sheet is the same as all other sheets in the fuel element.

4. A portable fuel element as in claim 2 wherein each of said sheets define a plurality of parallel portals defining a portal direction and the portal direction of each sheet is at right angles to all sheets adjacent to it.

5. A portable fuel element as in claim 1, wherein said portable fuel element contains a wick.

6. A portable cooking kit comprising:
   a) a cook kit comprising:
      1) a frame comprised of metal wire,
      2) a burn cup supported by said frame,
      3) a cooking pot support supported by said frame, and
   b) at least one fuel element comprised of a plurality of stacked sheets of cardboard impregnated and held together with paraffin wax sized to fit on or within said burn cup comprising:
      1) at least two fuel element subsections separated by a perforation, and
      2) at least one match located in a portal of one of said stacked sheets said portal being parallel and adjacent to said perforation.

7. A portable cooking kit as in claim 6 wherein said plurality of stacked sheets of cardboard are at least five stacked sheets of cardboard.

8. A portable cooking kit as in claim 7 wherein each of said sheets define a plurality of parallel portals defining a portal direction and the portal direction of each sheet is at right angles to all sheets adjacent to it.

9. A method of making a portable fuel element product comprising the steps of:
   a) soaking in melted paraffin wax a plurality of sheets of cardboard each sheet defining a plurality of cardboard portals.

b) stacking the sheets to form a stack of paraffin impregnated cardboard sheets, c) dividing said stack of sheets into a plurality of fuel element sections, d) inserting at least one match into a portal of one of said cardboard sheets, e) re-soaking said cardboard stack in said melted paraffin wax, f) permitting said paraffin wax to solidify forming a block of paraffin impregnated cardboard sheets each of said sheets containing said matches.

10. A method of making portable fuel element products as in claim 9, further comprising the steps of perforating said sheets to define a plurality of perforations prior to said stacking and aligning the sheets so that the plurality of perforations of each sheet are aligned vertically with each other sheet in the stack.

11. A method of making portable fuel element products as in claim 10, further comprising the step of breaking said stack apart into a plurality of fuel blocks along at least some of said aligned perforations.

12. A method of making portable fuel elements as in claim 11, wherein each of said fuel block comprises at least one unbroken aligned perforation.

13. A method of making portable fuel element products as in claim 12, wherein said at least one match is inserted into said blocks along said unbroken aligned perforation.

14. A method of making fuel elements as in claim 13, wherein said at least one match is two matches.

15. A method of making portable fuel element products as in claim 9, further comprising the step of gluing a rough striking surface to a side of said fuel element sections for the purpose of providing a striking surface for said at least one match.

* * * * *